United States Patent [19]
Ohshima et al.

[11] Patent Number: 5,745,320
[45] Date of Patent: Apr. 28, 1998

[54] APPARATUS FOR CLEANING HEADS OF A ROTARY DRUM IN A RECORDING AND/OR REPRODUCING APPARATUS

[75] Inventors: Eiji Ohshima; Atsuhiro Kumagai, both of Kanagawa, Japan

[73] Assignee: Sony Corporation, Tokyo, Japan

[21] Appl. No.: 806,482

[22] Filed: Feb. 27, 1997

Related U.S. Application Data

[63] Continuation of Ser. No. 653,821, May 28, 1996, abandoned, which is a continuation of Ser. No. 366,375, Dec. 29, 1994, abandoned, which is a continuation of Ser. No. 81,172, Jun. 25, 1993, abandoned.

[30] Foreign Application Priority Data

Jul. 7, 1992 [JP] Japan .................................. 4-203012

[51] Int. Cl.⁶ .................................................. G11B 5/41
[52] U.S. Cl. .................................................. 360/128
[58] Field of Search .............................. 360/128; 369/71, 369/72, 74; 451/541, 544, 547; 428/323

[56] References Cited

U.S. PATENT DOCUMENTS

| 3,653,859 | 4/1972 | Zimmer, Jr. et al. | 51/401 |
|---|---|---|---|
| 3,931,643 | 1/1976 | Kuroe | 360/128 |
| 4,704,647 | 11/1987 | Hino | 360/128 |
| 4,720,941 | 1/1988 | Belieff et al. | 451/541 |
| 4,789,590 | 12/1988 | Sato et al. | 428/323 |
| 4,803,120 | 2/1989 | Ogawa et al. | 428/323 |
| 4,840,842 | 6/1989 | Yamaguchi et al. | 428/323 |
| 5,170,304 | 12/1992 | Katohno et al. | 360/128 |
| 5,182,691 | 1/1993 | Mimasu et al. | 360/128 |
| 5,193,033 | 3/1993 | Shimoi et al. | 360/128 |
| 5,341,257 | 8/1994 | Dienbauer | 360/128 |

FOREIGN PATENT DOCUMENTS

| 2351527 | 4/1974 | Germany | 360/128 |
|---|---|---|---|
| 62-37447 | 8/1987 | Japan | 360/128 |
| 1191317 | 8/1989 | Japan | 360/128 |

*Primary Examiner*—Stuart S. Levy
*Assistant Examiner*—William R. Korzuch
*Attorney, Agent, or Firm*—Frommer Lawrence & Haug LLP; William S. Frommer

[57] ABSTRACT

Very small grains (103) are attached to a cleaning roller (100) made of a porous and flexible material such as a polyurethane foam or the like. In a magnetic head cleaning apparatus in which the cleaning roller that is brought in rotatable contact with a rotary head drum on which a magnetic head for recording and/or reproducing a magnetic tape is mounted to thereby clean the magnetic head, even adhesive alien substances that cannot be removed in the prior art can be removed with ease.

3 Claims, 3 Drawing Sheets

APPARATUS FOR CLEANING HEADS OF A ROTARY DRUM IN A RECORDING AND/OR REPRODUCING APPARATUS

This application is a continuation of application Ser. No. 08/653,821, filed on May 28, 1996, now abandoned, which is a continuation of application Ser. No. 08/366,375, filed on Dec. 29, 1994, now abandoned, which is a continuation of Ser. No. 08/081,172, filed on Jun. 25, 1993, now abandoned.

BACKGROUND OF THE INVENTION

1. Field of the Invention

The present invention relates to an apparatus for cleaning a magnetic head that is mounted on a rotary head drum of a video tape recorder (VTR) or the like to record and/or reproduce a signal on and/or from a magnetic tape.

2. Description of the Prior Art

In magnetic recording and/or reproducing apparatus such as a video tape recorder or the like for effecting recording and/or reproducing according to a helical scan system by using a rotary magnetic head, if a gap portion of the magnetic head is smudged by an alien substance or the like, then the correct recording and/or reproducing cannot be made. Therefore, one conventional magnetic recording and/or reproducing apparatus includes a cleaning apparatus for removing such alien substance or the like.

Magnetic head cleaning apparatus generally include a cleaning roller that is in rotatable contact with a circumferential surface of a rotary head drum. When the rotary head drum is rotated under the condition that the cleaning roller is in rotatable contact with the circumferential surface of the rotary head drum, the magnetic head and the cleaning roller are brushed against each other to remove alien substances or the like smudged on the gap portion of the magnetic head. A cleaning roller used in the conventional magnetic head cleaning apparatus comprises a roller 100, made of polyurethane foam and a plurality of vertical grooves (slits) 101 formed on the circumferential surface (surface at which the cleaning roller is in rotatable contact with the rotary head drum) of the roller 100 as shown in FIG. 1. Alternatively, as shown in FIG. 2, a conventional cleaning roller 100 is formed by laminating about 100 sheets of disk-shaped non-woven fabrics 102 into which a binding agent or the like is permeated.

The aforesaid conventional head cleaning rollers, however, cannot avoid the following defects. That is, the former head cleaning roller (in case of FIG. 1) intends to rake out the alien substances stored in the gap portion of the magnetic head by the stepped portions formed by the slits 101 but it is substantially useless for removing adhesive alien substances. The latter head cleaning roller (in case of FIG. 2) has a strong cleaning effect enhanced by the permeation of the binding agent into the non-woven fabrics 102 but is very expensive because a number of non-woven fabrics 102 are laminated.

OBJECTS AND SUMMARY OF THE INVENTION

Therefore, it is a general object of the present invention to provide a magnetic head cleaning apparatus in which the aforesaid shortcomings and disadvantages of the prior art can be eliminated.

More specifically, it is an object of the present invention to provide a magnetic head cleaning apparatus in which an adhesive alien substance and so on can be removed by very small grains reliably.

It is another object of the present invention to provide a magnetic head cleaning apparatus in which even an ordinary alien substance can be removed more effectively as compared with the prior art.

It is a further object of the present invention to provide a magnetic head cleaning apparatus in which a cleaning effect can be demonstrated continuously.

It is yet a further object of the present invention to provide a magnetic head cleaning apparatus which can be manufactured inexpensively.

According to a first aspect of the present invention, there is provided a magnetic head cleaning apparatus having a cleaning device for cleaning a magnetic head when brought in rotatable contact with a rotary head drum that records and/or reproduces signals from a magnetic tape which comprises very small grains attached to the cleaning device.

According to a second aspect of the present invention, there is provided a method of manufacturing a magnetic head cleaning roller which comprises the steps of mixing very small grain powders into a solvent to form a mixture, soaking a roller body that is brought in rotatable contact with a rotary head drum on which a magnetic head for recording and/or reproducing signals from a magnetic tape is mounted with the mixture, and drying the roller body soaked with the mixture to thereby combine the very small grains to the roller.

According to a third aspect of the present invention, there is provided a method of manufacturing a magnetic head cleaning roller which comprises the step of molding a roller that is brought in rotatable contact with a rotary head drum on which a magnetic head for recording and/or reproducing signals from a magnetic tape is mounted by a material in which very small grains are mixed into a polyurethane foam.

The above and other objects, features, and advantages of the present invention will become apparent from the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

An embodiment of the present invention will hereinafter be described with reference to FIGS. 3A, 3B to FIG. 5.

Figure 4:
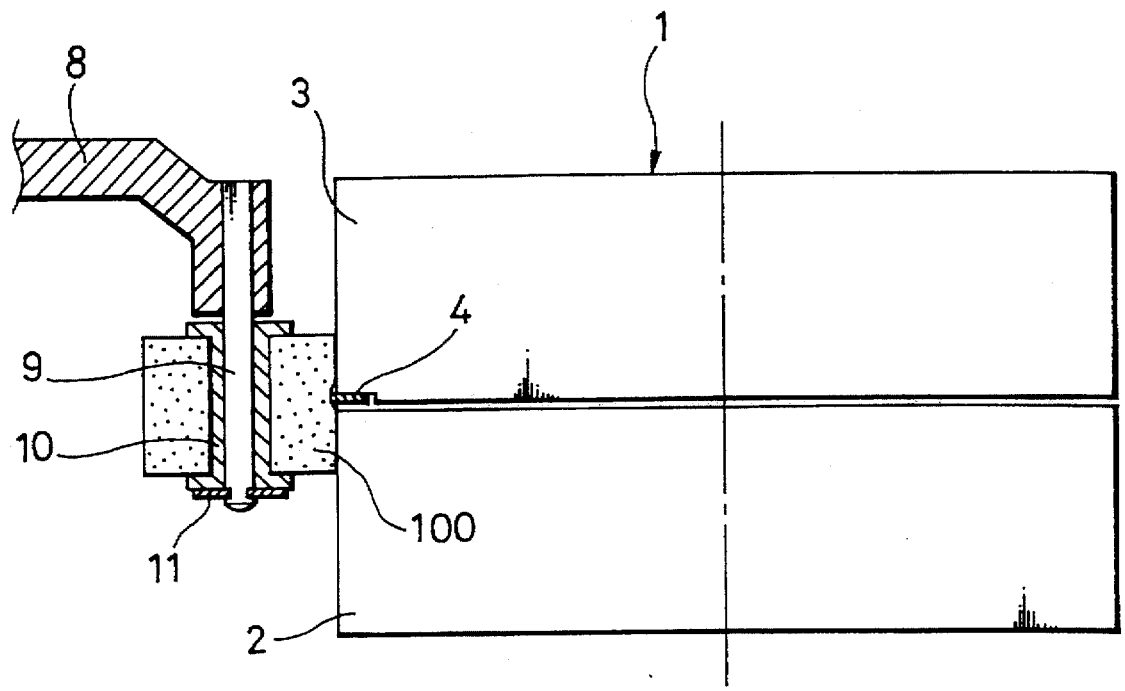
FIG. 4 is a side view illustrating the cleaning roller that is in rotatable contact with the rotary head drum.

As illustrated, there is provided a rotary head drum 1 around which a magnetic tape (not shown) is wound in a magnetic recording and/or reproducing apparatus such as a video tape recorder or the like. As shown in FIG. 4, the rotary head drum 1 comprises a stationary drum 2 and a rotary drum 3 that is rotated at high speed with respect to the stationary drum 2. A magnetic head 4 that records and/or reproduces the magnetic tape is mounted on the rotary drum 3. A top of the magnetic head 4 is slightly projected from the circumferential surface of the rotary head drum 1.

Figure 1:
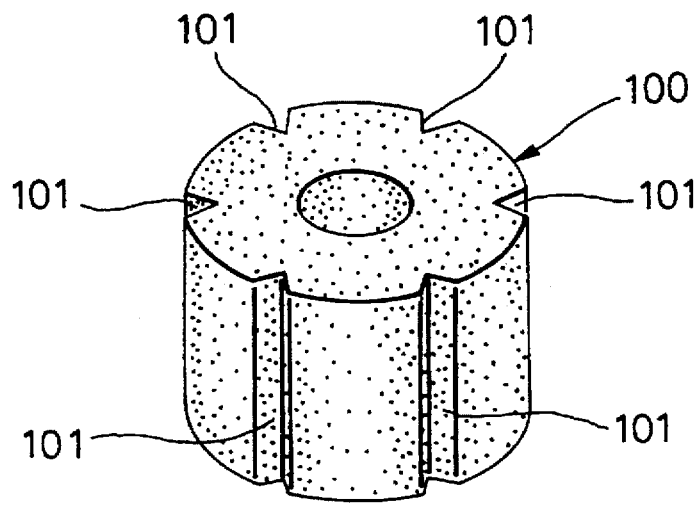
FIG. 1 is a perspective view useful for explaining an example of a conventional cleaning roller.
Figure 2:
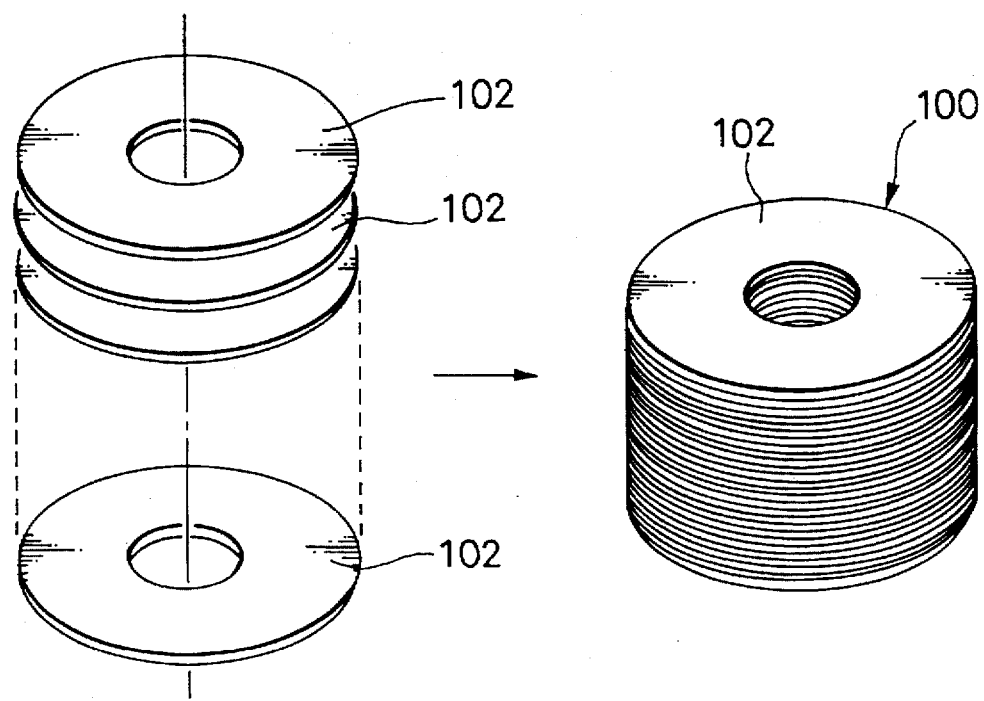
FIG. 2 is a perspective view useful for explaining another example of the conventional cleaning roller.
Figure 3A:
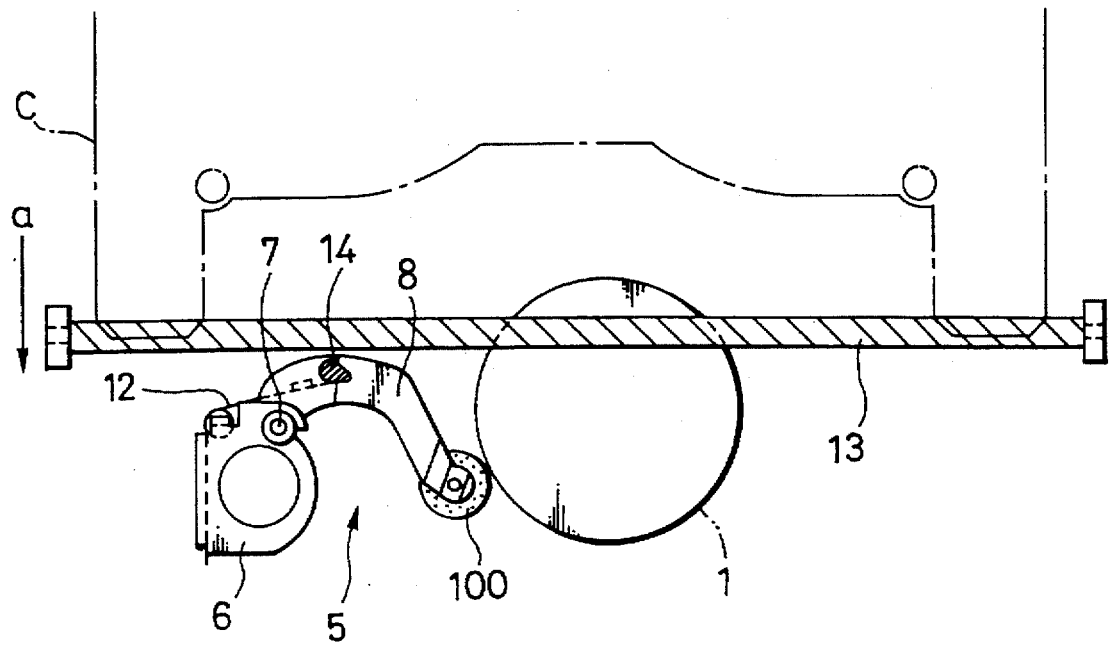
FIG. 3A is a plan view illustrative of the condition that a cleaning roller according to an embodiment of the present invention is in rotatable contact with a rotary head drum.
Figure 3B:
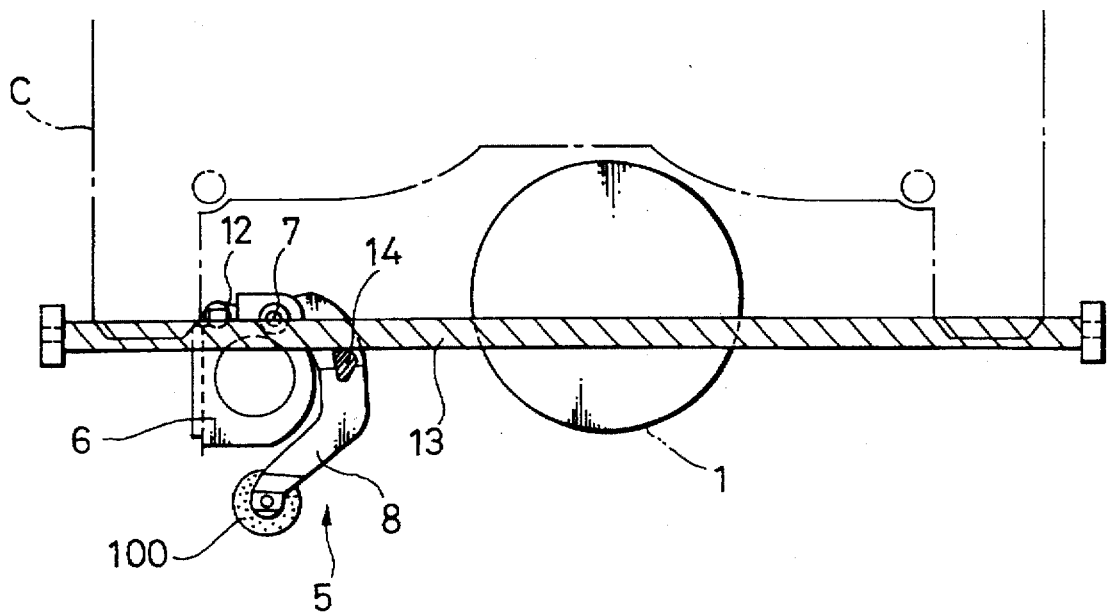
FIG. 3B is a plan view illustrative of the condition that the cleaning roller is detached from the rotary head drum.

A magnetic head cleaning apparatus 5 is provided to clean the magnetic head 4 mounted on the rotary head drum 1. As shown in FIGS. 3A and 3B, the magnetic head cleaning apparatus 5 comprises a stationary base 6, an arm 8 attached through a shaft 7 to the stationary base 6 so as to become rotatable about the shaft 7 and a cleaning roller 100 pivotally attached to the free end of the arm 8.

A structure of a pivot portion of the cleaning roller 100 will be described with reference to FIG. 4. As shown in FIG. 4, the cleaning roller 100 is rotatably attached to a shaft post 9 implanted on the free end of the arm 8 through a collar 10. The cleaning roller 100 can be prevented from being unintentionally drawn out from the shaft post 9 by a washer 11.

As shown in FIGS. 3A and 3B, the cleaning roller 100 is constantly brought in rotatable contact with the circumferential surface of the rotary head drum 1 with a pressure under a spring force of a torsion coil spring 12 extended between the stationary base 6 and the arm 8. When the rotary drum 3 of the rotary head drum 1 is rotated under the condition that the cleaning roller 100 is brought in contact with the circumferential surface of the rotary head drum 1, the top of the magnetic head 4 projected from the circumferential surface of the rotary head drum 1 and the cleaning roller 100 are rubbed with each other, whereby smudged alien substances of the magnetic head 4 are scraped away therefrom i.e., the cleaning of the magnetic head 4 is effected.

The cleaning roller 100 is detached from the rotary head drum 1 under the condition that the loading of the tape cassette onto the magnetic recording and/or reproducing apparatus has been finished. That is, when a tape cassette C is inserted into the magnetic recording and/or reproducing apparatus and the loading operation is started, a translating rod 13 that forms a part of the loading mechanism is advanced in the direction shown by an arrow a in FIG. 3A in synchronism with the loading operation, a projection 14 implanted on the upper surface of the arm 8 is pushed by the translating rod 13, whereby the cleaning roller 100 is moved away from the circumferential surface of the rotary head drum 1 against spring force of the torsion coil spring 12 (state shown in FIG. 3B). Therefore, the cleaning roller 100 can be prevented from hindering operation in which the magnetic tape is wrapped around the rotary head drum 1 and also the tape travel. When the tape cassette C is ejected from the magnetic recording and/or reproducing apparatus, the translating rod 13 is moved backward in synchronism with the unloading operation, whereby the cleaning roller 100 is again brought in rotatable contact with the circumferential surface of the rotary head drum 1 under spring force of the torsion coil spring 12.

Figure 5:
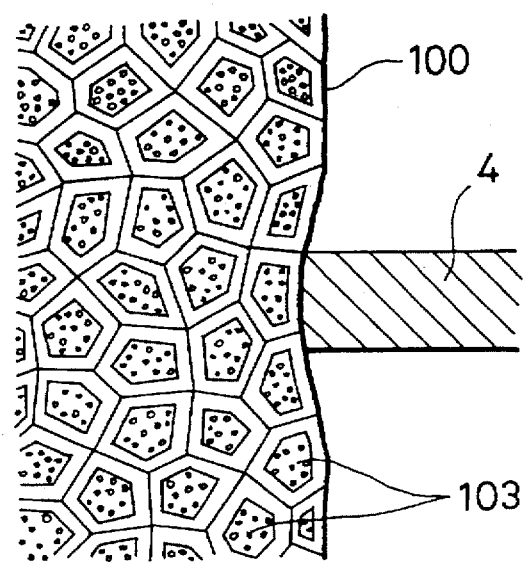
FIG. 5 is a diagram showing the embodiment of the cleaning roller in an enlarged scale.

The structure and a manufacturing method of the cleaning roller 100 will be described more in detail with reference to FIG. 5.

The cleaning roller 100 is made by the molding process of a porous and flexible material such as polyurethane foam to which there are attached very small grains 103 that are utilized for a video head wrapping tape or the like. The very small grains may be made of any material which is suitable for grinding. For example, $CaCo_3$, $ZnO$, $Al_2O_3.4SiO_2.H_2O$, $Al_2O_3.2SiO_2.2H_2O$ and $BaSO_4$ have been known to be used as the material for such very small grains for cleaning a magnetic head, as shown in Japanese Patent No. 62-37447 issued on Aug. 12, 1987. The very small grains 103 attached to the cleaning roller 100 are laid in a three-dimensional mesh-structure of the polyurethane foam, which becomes effective when the magnetic head is cleaned, as will be described later.

The cleaning roller 100 to which the very small grains 103 are attached can be manufactured by the following methods.

(1) Put a roller body in powders of very small grains and accumulate grains in the mesh structure of the roller.

(2) Mix very small grain powders with a solvent and soak the roller body into a mixed product and dry the same. Thus, very small grains are attached to the roller.

(3) When the cleaning roller is molded by polyurethane foam, very small grains are mixed therewith.

When the magnetic head 4 is cleaned by the cleaning roller 100, the very small grains 103 accumulated inside the roller 100 slightly grind the surface of the magnetic head 4 constantly, thereby removing alien substances or the like smudged on the magnetic head 4. In this case, even adhesive alien substances can be removed reliably and even ordinary alien substances having no adhesion can be cleaned more effectively. A grinding force of the cleaning roller 100 is prevented from being increased too much by selecting a pressing force to the rotary head drum 1 to be about 10 g to thereby prevent the magnetic head 4 from being worn out.

When the magnetic head 4 is cleaned by the cleaning roller 100, even if the very small grains 103 near the surface of the roller 100 are consumed, then the very small grains 103 accumulated in the inside of the roller 100 appear near the surface thereof in synchronism with the revolution of the roller, achieving a cleaning effect continuously. Further, even when the very small grains 103 accumulated in the inside of the roller 100 are consumed thoroughly, the cleaning roller 100 can keep its cleaning effect that is achieved by the ordinary cleaning roller made of polyurethane foam. Furthermore, the cleaning roller 100 can be provided inexpensively although it achieves a great effect. Therefore, it is possible to realize a magnetic head cleaning apparatus which can be made inexpensive and which can achieve a cleaning effect reliably.

As described above, according to the magnetic head cleaning apparatus of the present invention, owing to the grinding effect achieved by the very small grains, the adhesive alien substances smudged on the magnetic head can be removed reliably. Further, even the ordinary alien substances having no adhesion can be cleaned more effectively as compared with the prior art. In addition, the cleaning effect achieved by the very small grains can be demonstrated continuously. Further, even after the very small grains were consumed thoroughly, the average cleaning effect can be kept. Furthermore, the magnetic head cleaning apparatus of the present invention can be produced inexpensively although it is quite effective for cleaning the magnetic head. Therefore, the magnetic head cleaning apparatus of the present invention can achieve a variety of effects that the prior art cannot achieve in actual practice.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A magnetic head cleaning apparatus for cleaning a magnetic head mounted on a rotary head drum in a recording and/or reproducing apparatus for a tape cassette which has a loading mechanism for loading and unloading the tape cassette, and includes a translating rod, said magnetic head cleaning apparatus comprising:

rotatably supported cleaning roller means for cleaning said magnetic head when an outer surface of the cleaning roller means is brought in rotatable contact with said rotary head drum, said cleaning roller means including the outer surface thereof and an interior being made of polyurethane foam having a three-dimensional mesh structure and said cleaning roller means being supported in a generally upright configuration;

very small grains suitable for grinding are accumulated in said three-dimensional mesh structure of said outer surface and said interior of said cleaning roller means, wherein when said very small grains along the outer surface of said cleaning roller means are consumed, said very small grains accumulated in the interior of said cleaning roller means appear near the outer surface in synchronism with the rotation of said cleaning roller means to thereby achieve a continuous cleaning of said magnetic head; and arm means for supporting said cleaning roller means and having an upper surface on which is formed a projection, said arm means being operable for bringing said cleaning roller means into rotatable contact with the rotary head drum when the cassette is unloaded, said arm means being pivotally movable between a first position, wherein said cleaning roller means is brought into contact with the rotary head drum, and a second position, wherein the projection formed on said upper surface of said arm means is directly engaged by said translating rod of said loading mechanism of the recording and/or reproducing apparatus only when a cassette is loaded, wherein the cassette pushes the translating rod which pushes said arm means such that said cleaning roller means is removed from the rotary head drum.

2. A magnetic head cleaning apparatus according to claim 1, further comprising said translating rod serving as one portion of a loading mechanism for loading a tape cassette into recording and/or reproducing relation with respect to said rotary head drum, said translating rod moving said cleaning roller means away from said rotary head drum against said spring-biased means when said tape cassette is loaded relative to said rotary head drum.

3. A method of manufacturing a magnetic head cleaning assembly including a cleaning roller having an exposed outer surface and an interior portion for cleaning a rotary magnetic head when brought in rotatable contact therewith, the method of manufacturing said magnetic head cleaning assembly comprising the steps of:

mixing very small grains of material suitable for grinding with a polyurethane foam having a three-dimensional mesh structure to form a mixture with said very small grains accumulated in said three-dimensional mesh structure;

molding a roller from the mixture of said polyurethane foam and said very small grains such that said very small grains are accumulated along said exposed outer surface and said interior portion of the roller wherein when said very small grains along the exposed surface of said roller are consumed during grinding, said very small grains accumulated in said interior portion of said roller appear near the outer surface thereof in synchronism with the rotation of said roller to thereby achieve a continuous cleaning of the magnetic head; and attaching said roller to an end of a spring-loaded arm in a generally upright configuration, said arm having a projection formed on its upper surface;

assembling said arm in a recording and/or reproducing apparatus for a tape cassette which has a loading mechanism for loading and unloading the cassette and includes a translating rod so that said arm is movable between a first position, wherein said cleaning roller means is brought into contact with a rotary head drum of said recording and/or reproducing apparatus when the cassette is unloaded, and a second position, wherein said projection is directly engaged by said translating rod of the loading mechanism of said recording and/or reproducing apparatus only when the cassette is loaded, wherein the cassette pushes the translating rod which pushes said arm such that said roller is removed from the rotary head drum.

* * * * *